(12) United States Patent
Henry et al.

(10) Patent No.: US 7,187,262 B1
(45) Date of Patent: Mar. 6, 2007

(54) PLASTIC SEALING OF SOLENOID BOBBINS

(75) Inventors: James P. Henry, Fairport, NY (US); Gary J. DeAngelis, Spencerport, NY (US); Kevn J. Allen, Avon, NY (US); Peter R. Wendt, Fairport, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/203,855

(22) Filed: Aug. 15, 2005

(51) Int. Cl.
*H01F 27/30* (2006.01)

(52) U.S. Cl. .................................. 336/198; 336/98
(58) Field of Classification Search ............ 336/90–96, 336/192, 198
See application file for complete search history.

(56) References Cited

U.S. PATENT DOCUMENTS 5,659,246 A * 8/1997 Togo et al. ............ 324/207.15
6,118,361 A * 9/2000 Ogawa ........................ 336/96

\* cited by examiner

*Primary Examiner*—Tuyen T Nguyen
(74) *Attorney, Agent, or Firm*—Paul L. Marshall

(57) ABSTRACT

A method and apparatus for overmolding a plastic shroud onto a bobbin including the step of providing a protrusion ring on the surface of the bobbin surrounding each standoff between the bobbin and a mold wall and extending outwards from the surface of the bobbin. A plurality of standoffs and protrusion rings is presently preferred. The protrusion rings are small relative to the standoffs, have low thermal mass, and thus are readily melted by the injected molten plastic, causing interstitching between the bobbin material and the overmolding material. The interstitching creates a highly effective hermetic seal against moisture leakage along the surface of the bobbin away from the standoff site. Perfect melting of the standoffs is no longer required, and standoffs can be designed to assure proper positioning of the bobbin during the complete overmolding process.

5 Claims, 3 Drawing Sheets

PLASTIC SEALING OF SOLENOID BOBBINS

TECHNICAL FIELD

The present invention relates to electric solenoid actuators; more particularly, to solenoid actuators for engine fuel injectors; and most particularly, to improved method and apparatus for providing a plastic overmolding to hermetically seal electrical components of a fuel injector solenoid.

BACKGROUND OF THE INVENTION

Fuel injectors for internal combustion engines are well known. A typical fuel injector comprises a metering poppet valve, a linear solenoid for actuating the valve, and an overmolded plastic shroud for isolating the electrical components from moisture and dirt. In the prior art, it has proved difficult to provide a reliable hermetic seal of components, including the wire-wound bobbin, which seal is essential to long-term performance of the fuel injector.

In overmolding a hermetic shroud, the solenoid bobbin is positioned in a mold by a plurality of plastic standoffs formed on the bobbin and disposed between the bobbin and the wall of the mold. Ideally, the standoffs are melted by the injected shrouding plastic, forming a seamless plastic layer over the bobbin. However, in practice it has been found very difficult to provide a standoff having precisely the correct size, shape, and thermal properties. If the standoff is too small, its melting allows the bobbin to shift in the mold; if too large, it fails to melt completely, resulting in a stress interface between the injected plastic and the unmelted standoff. This interface tends to be a leak path for moisture. Standoffs formed alternatively in the mold wall are unsatisfactory for causing molding imperfections in the shroud, leading to moisture penetration of the shroud in use.

It is known to use various types of seals around the standoffs, including O-rings, to eliminate entrance of moisture into a solenoid. Such seals offer some improvement in performance but are expensive to install and are very vulnerable to damage during assembly of a solenoid, thus negating their advantage. Further, damage to an O-ring or seal is not readily identified at the time the damage occurs and becomes evident only upon failure of the solenoid in customer usage.

What is needed in the art of solenoid manufacture is an improved method and apparatus for overmolding a plastic solenoid shroud which results in elimination of prior art leak paths for moisture penetration of the solenoid.

It is a principal object of the present invention to provide an improved solenoid wherein prior art moisture leak paths are eliminated.

It is a further object of the invention to improve the reliability and working life of a fuel injector for an internal combustion engine.

SUMMARY OF THE INVENTION

Briefly described, a method and apparatus for overmolding a plastic shroud onto a bobbin includes the step of providing a protrusion ring on the surface of the bobbin, surrounding each standoff and extending outwards from the surface of the bobbin. A plurality of standoffs and protrusion rings is presently preferred. The protrusion rings are small relative to the standoffs, have low thermal mass, and thus are readily melted by the injected plastic, causing interstitching between the bobbin material and the overmolding material. The interstitching creates a highly effective hermetic seal against moisture leakage along the surface of the bobbin away from the standoff site. Perfect melting of the standoffs is no longer required, and standoffs can be designed to assure proper positioning of the bobbin during the complete overmolding process.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
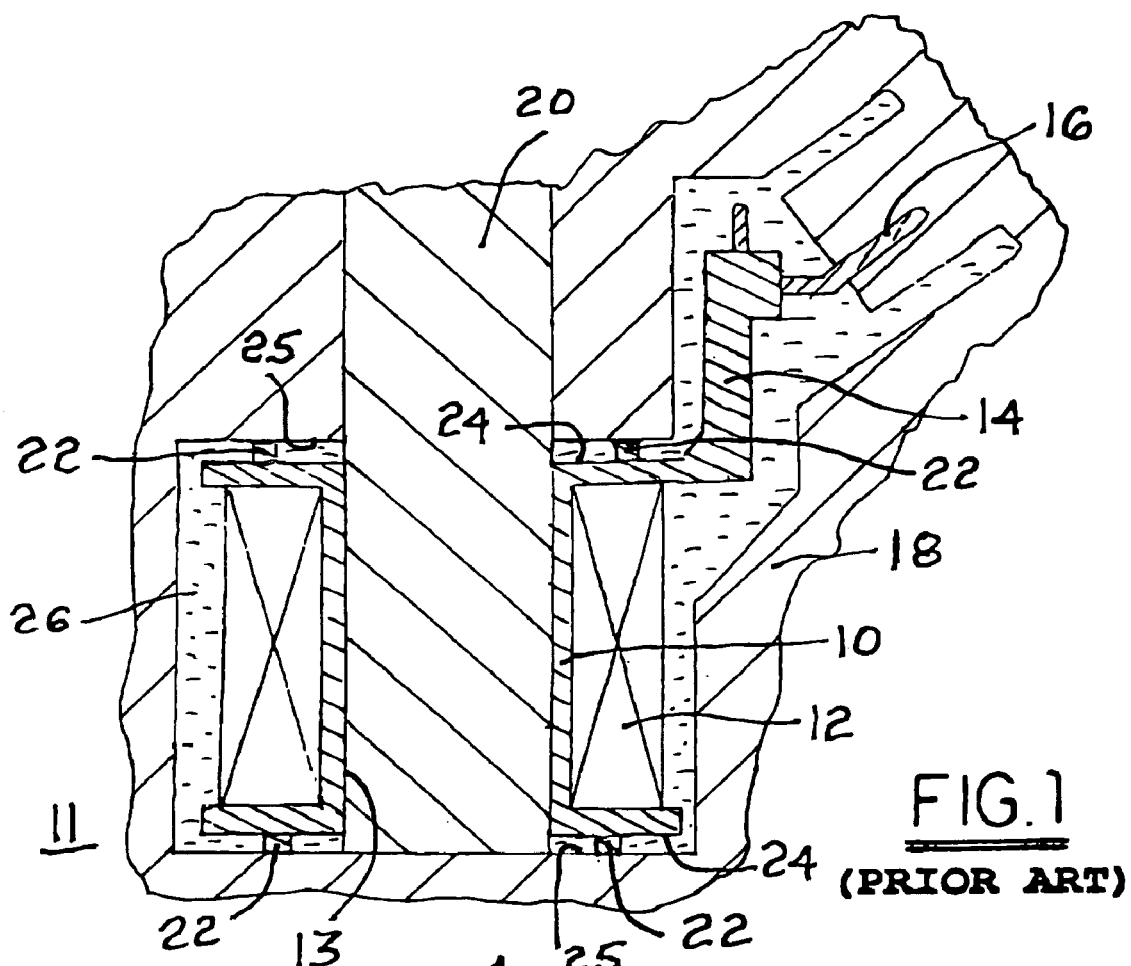
FIG. 1 is an elevational cross-sectional view of a prior art solenoid bobbin in an injection mold for overmolding of a hermetic plastic shroud, taken along line 1—1 in FIG. 2.
Figure 2:
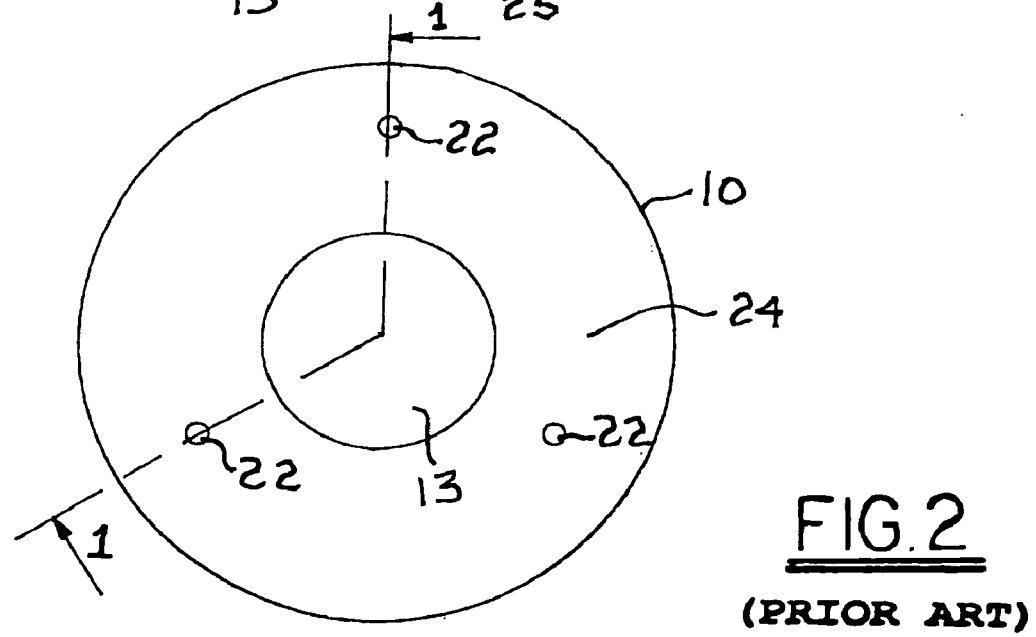
FIG. 2 is a plan view of a prior art solenoid bobbin shown in FIG. 1, showing integral standoffs.

Referring to FIGS. 1 and 2, a prior art solenoid bobbin 10 is wrapped conventionally with wire 12. Bobbin 10 includes a bobbin extension 14 connected to a spade connector 16. In FIG. 1, wound bobbin 10 is shown inserted into a schematic female mold 18 and core pin 20. Bobbin 10 is provided with a central aperture 13 and with a plurality of standoffs 22 formed in end faces 24 for correctly positioning bobbin 10 axially in mold 18 to create a void for injection of molten polymer. After such insertion, mold 18 is filled with a liquid polymer in known fashion to produce an overmolded shroud 26 surrounding bobbin 10. Bobbin 10 may be used subsequently as a component of, for example, a solenoid actuator for a fuel injector 11 of an internal combustion engine, in known fashion that need not be further elaborated herein.

As described above, a problem inherent in such a prior art bobbin and molding process is that the liquid polymer can fail to knit properly to the surface of the bobbin and especially to and around standoffs 22, resulting in a leak path for moisture into the windings.

Note that standoffs 22 may alternatively be formed in the prior art as a part of walls 25 of mold 18, which arrangement is still less satisfactory because polymer cannot flow properly between the end of the stand off and the face of the bobbin to properly coat the face of the bobbin, thus leaving a void in the shroud.

Figure 3:
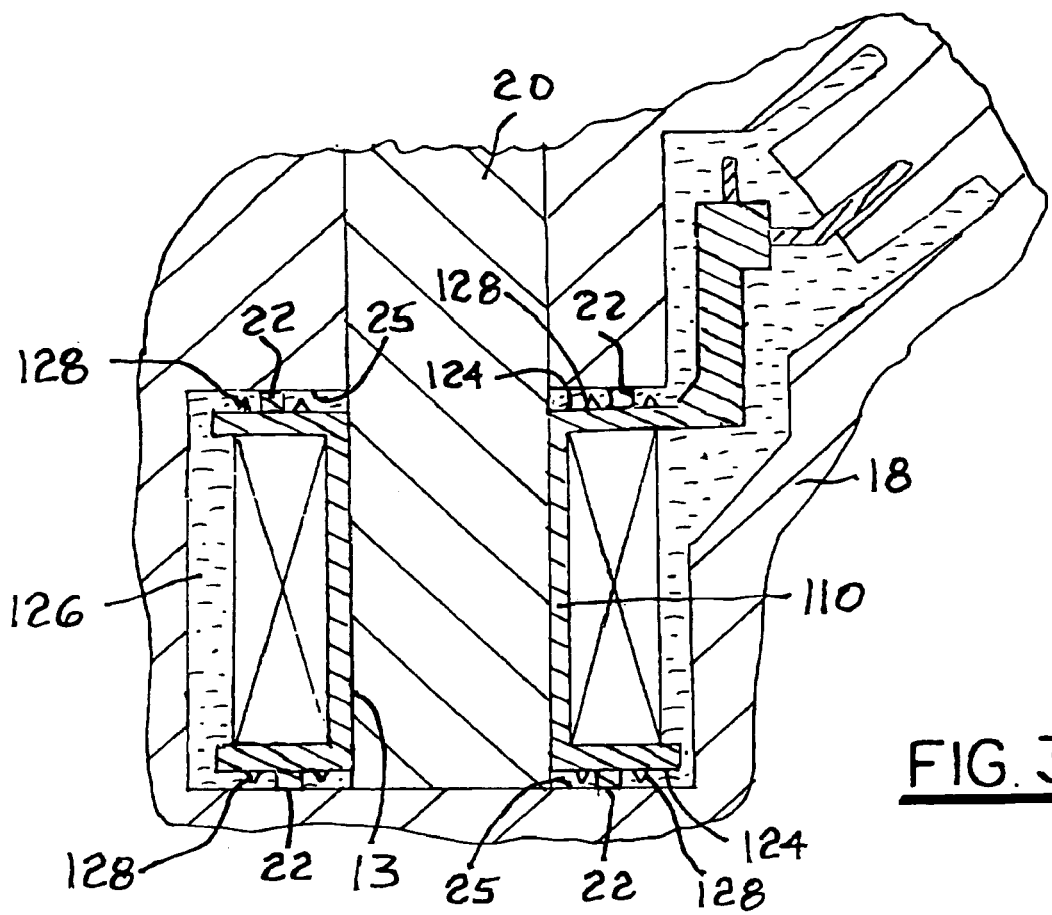
FIG. 3 is an elevational cross-sectional view of an improved solenoid bobbin in accordance with the invention in a injection mold for overmolding of a hermetic shroud, taken along line 3—3 in FIG. 4.
Figure 4:
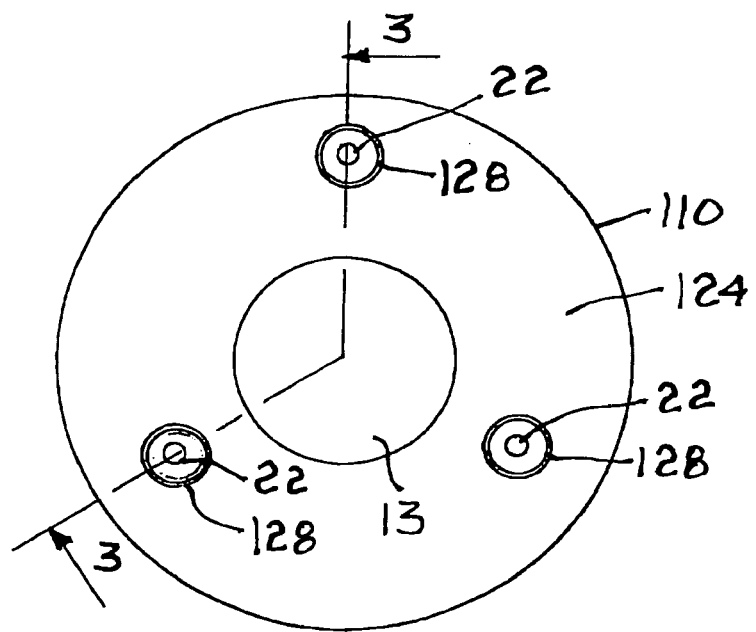
FIG. 4 is a plan view of a first embodiment of an improved bobbin in accordance with the invention, showing integral standoffs and protrusion rings.
Figure 5:
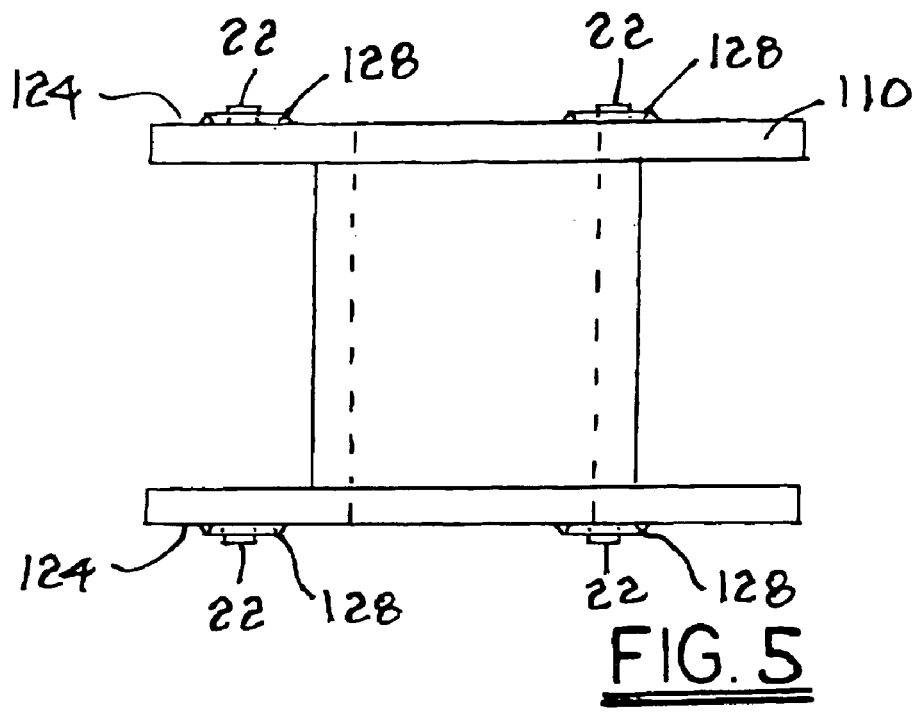
FIG. 5 is an elevational view of the improved bobbin shown in FIG. 4.

Referring to FIGS. 3 through 5, an improved bobbin 110 in accordance with the invention is identically disposed within mold 18 and core pin 20 for producing an improved overmold shroud 126 around bobbin 110. As in prior art bobbin 10, a plurality of standoffs 22 are formed in the faces 124 of bobbin 110 to position bobbin 110 correctly axially within mold 18. In addition to standoffs 22, a protrusion ring 128 is formed in bobbin faces 124 surrounding each standoff 22. Rings 128 extend axially from faces 124 and preferably are tapered in cross-sectional shape, terminating in a sharp apex. Rings 128 are formed of the same polymer as is bobbin 110 and are integral therewith. The axial extent of rings 128 from faces 124 is less than the extent of standoffs 22 such that liquid polymer can flow into, as well as around, the rings during overmolding of shroud 126.

In the overmolding process, at least a portion of rings 128 is melted and fused with the hot molten overmolding polymer to produce a circular, reliable, hermetic interstitching line around each standoff 22, thus bonding the polymer to the bobbin. Moisture is thus prevented from gaining access to the windings 12 during use of bobbin 110.

Figure 6:
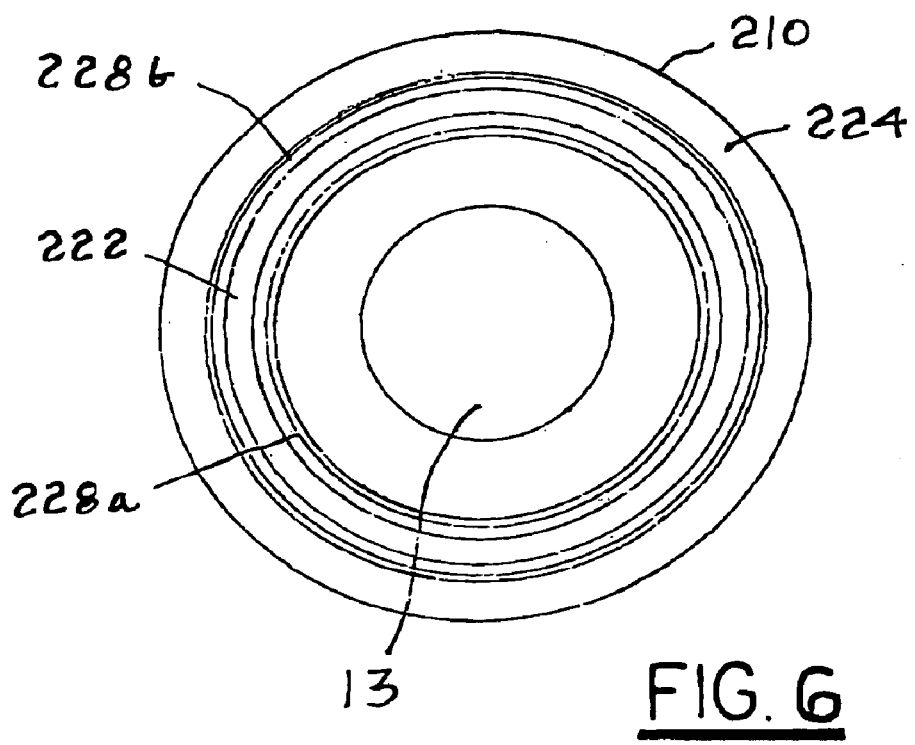
FIG. 6 is a plan view of a second embodiment of an improved bobbin in accordance with the invention, showing integral standoffs and protrusion rings.

Referring to FIG. 6, a second embodiment of an improved bobbin 210 in accordance with the invention comprises bobbin faces 224 having a single generally circular standoff 222 bracketed by a single inner protrusion ring 228*a* and a single outer protrusion ring 228*b*. In the overmolding process, at least a portion of rings 228*a*, 228*b* is melted and fused with the hot molten overmolding polymer to produce a circular, reliable, hermetic interstitching line around each circular standoff 222, thus bonding the polymer to the bobbin and preventing moisture from gaining access to the windings 12 during use of bobbin 210.

While the stand offs and protrusion rings are shown located on one or both of the end faces of the bobbin to control the axial position of the bobbin within the mold, it is understood that the stand offs and accompanying protrusion rings, in accordance with the invention, may be located on any surface of the bobbin, for example, on a side face to position the bobbin radially within the mold.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A bobbin for use in forming a solenoid by being wound with a wire winding and overmolded in a mold to form a plastic overmolded shroud, said bobbin including an end face comprising
   a) a generally planar surface;
   b) a standoff formed in said end face and extending above said surface for establishing a space between said surface and said mold; and
   c) a protrusion ring formed in said end face extending above said surface and surrounding said standoff spaced apart therefrom for interknitting with molten polymer injected into said mold to form a knitline between said bobbin and said polymer around said standoff.

2. A bobbin in accordance with claim 1 wherein said bobbin is formed of the same or similar polymer as said melted polymer.

3. A bobbin in accordance with claim 1 comprising a plurality of standoffs and a plurality of protrusion rings surrounding said standoffs.

4. A bobbin in accordance with claim 1 having an additional end face at an opposite end thereof, said additional face being provided with at least one standoff and at least one protrusion ring surrounding said standoff.

5. A bobbin for use in forming a solenoid by being wound with a wire winding and overmolded in a mold to form an plastic overmolded shroud, said bobbin comprising
   a) at least one surface;
   b) a standoff protruding from said surface for positioning the bobbin within the mold; and
   c) a protrusion ring formed in said surface and surrounding said standoff spaced apart therefrom, said protrusion ring being adapted to melt and fuse to the melted polymer injected into said mold to form a hermetic bond between said bobbin and said polymer around said standoff.

* * * * *